(No Model.)
W. SHAW.
RASP.
No. 545,739. Patented Sept. 3, 1895.
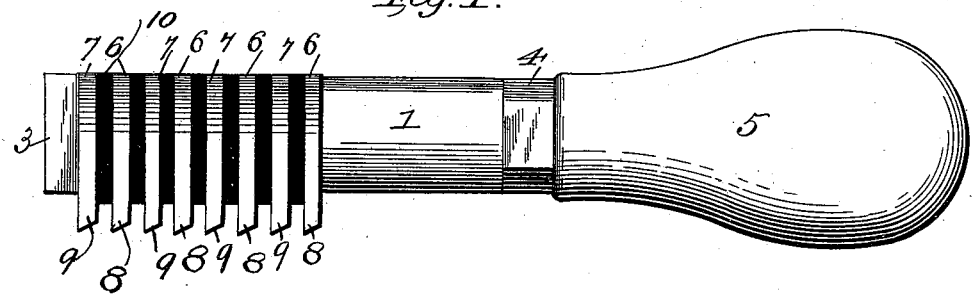
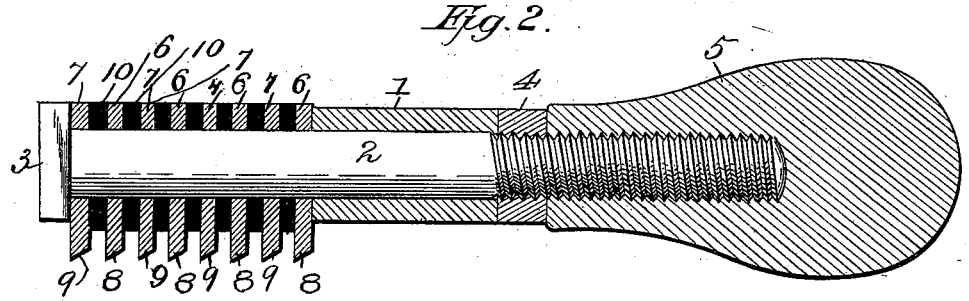
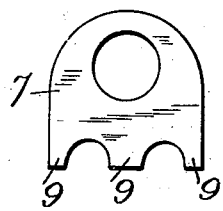
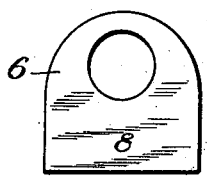
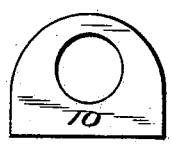
WITNESSES:
F. L. Durand
Jno. L. Coombs
INVENTOR:
William Shaw,
by Louis Bagger & Co
Attorneys.

UNITED STATES PATENT OFFICE.

WILLIAM SHAW, OF ITHACA, MICHIGAN.

RASP.

SPECIFICATION forming part of Letters Patent No. 545,739, dated September 3, 1895.

Application filed April 22, 1895. Serial No. 546,732. (No model.)

*To all whom it may concern:*

Be it known that I, WILLIAM SHAW, a citizen of the United States, and a resident of Ithaca, in the county of Gratiot and State of Michigan, have invented certain new and useful Improvements in Rasps; and I do hereby declare that the following is a full, clear, and exact description of the invention, which will enable others skilled in the art to which it appertains to make and use the same, reference being had to the accompanying drawings, which form a part of this specification.

My invention relates to rasps especially designed for use in treating the hoofs of horses preparatory to shoeing; and it consists in the novel construction and combination of parts, as hereinafter fully described and claimed.

In the accompanying drawings, Figure 1 is a side elevation of a rasp constructed in accordance with my invention. Fig. 2 is a vertical longitudinal sectional view, the rod, however, being shown in full lines. Figs. 3, 4, and 5 are face views or elevations of the rasping-plates and washer.

In the said drawings, the reference-numeral 1 designates a tubular sleeve through which passes a rod 2, having a head 3 at one end and screw-threaded at the other end, and provided with a nut 4 and a handle 5.

The numerals 6 and 7 designate the rasping or cutting plates, made of steel and provided with apertures for the passage of the rod 2. The plates 6 are rounded at one end and the other end made straight and beveled, forming cutting or rasping blades 8. The plates 7 are also rounded at one end, and at the other end are formed with beveled teeth 9. The numeral 10 designates washers of india-rubber or other elastic material. In assembling the parts one of the toothed blades is placed on the rod, then a washer, and then a plate with a blade, and so on until the proper or requisite number are strung on the rod, the toothed plates with blades alternating with each other. The sleeve 1 is then slipped on the rod 2 and the nut 4 screwed home, so as to compress the plates and washers between the same and the head of the rod. The handle 5 is then screwed on. By this construction and by means of the elastic washers the plates are securely held in place and prevented from turning on the rod.

The rasp is used in the ordinary manner, being drawn back and forth over a horse's hoof, as will be obvious.

Having thus fully described my invention, what I claim is—

The combination with the headed rod provided with screw-threads on its end opposite the head, of the toothed rasping-blades the teeth of which are provided with beveled edges, the alternating toothless rasping-blades having beveled edges, the rubber washers interposed between the toothed and plain rasping-blades, the tubular sleeve and the securing-nut and handle, substantially as specified.

In testimony that I claim the foregoing as my own I have hereunto affixed my signature in presence of two witnesses.

WILLIAM SHAW.

Witnesses:
ADELBERT P. LANE,
WOLF. METZORG.